Dec. 3, 1968  H. O. EADS ET AL  3,413,790
ADJUSTABLE CULTIVATING RAKE
Filed Aug. 29, 1966

INVENTORS
Harold O. Eads
James W. Robison
by Roberts, Cushman & Grover
Att'ys 3,413,790
ADJUSTABLE CULTIVATING RAKE
Harold O. Eads, Parkersburg, W. Va., and James W. Robison, Belpre, Ohio, assignors to McDonough Company, Parkersburg, W. Va., a corporation of Delaware
Filed Aug. 29, 1966, Ser. No. 575,631
1 Claim. (Cl. 56—400.06)

ABSTRACT OF THE DISCLOSURE

The nature and gist of the invention asserted, the nature and general substance of the subject matter being claimed, and the inventive concept involved, reside in an adjustable cultivating rake of multi-purpose design and of durable, economical construction, and having a rigid head assembly of spaced raking tines and transverse supporting tubes suited both to lawn conditioning and to soil preparing uses, and an adjustable handle mounting adapting the rake for fixing the tines in different raking and cultivating attitudes, and for positioning the handle for convenient holding by different operators and in different applications.

BACKGROUND OF THE INVENTION

The invention pertains to the art of hand rakes, of the class exemplified for example by United States Patent No. 1,894,306, granted Jan. 17, 1933, to R. W. Eifert, and United States Patent No. 3,193,999, granted July 13, 1965, to P. K. Hester. The principal problem solved by applicants' invention is that of providing integral, lightweight axle means rigidly mounting the tines in parallel spaced array and which lockingly retain them both against deflection laterally of and against shifting rotatably about the axle means.

DESCRIPTION OF THE INVENTION

The invention will be fully understood from the following description, taken together with the accompanying drawings of a preferred embodiment, and wherein.

Figure 1:
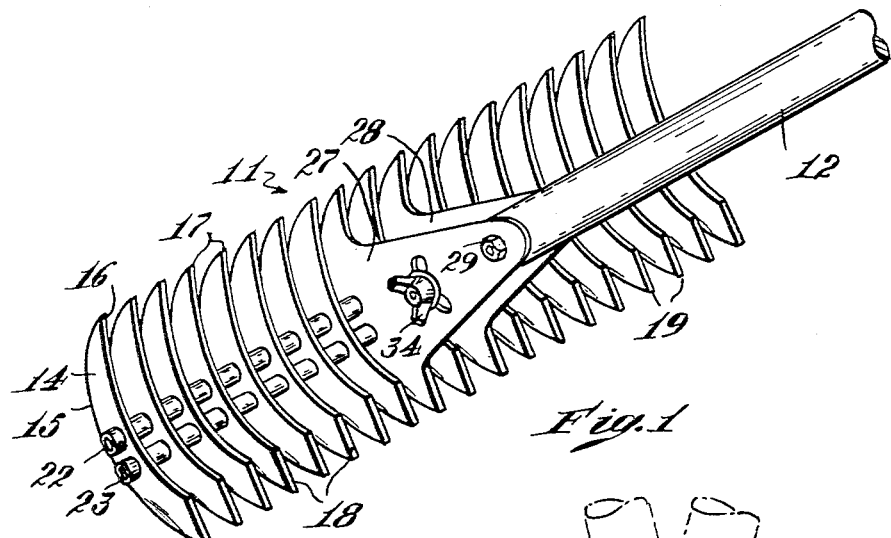
FIG. 1 is a perspective view of the rake assembly.

The rake hereof comprises a head assembly indicated generally at 11, a rigid, elongated handle member or shaft 12, which may be burnt ash, and an adjustable connection 13 between the head and handle and providing for their releasable securing in different selected angular relations, whereby the rake is adapted for manipulating by different operators and for various purposes.

The rake head 11 comprises a multiplicity of rigid metal lawn and garden cleaning and cultivating blades or tines 14. The similar tines 14 are generally of shallow crescent shape, defined by curved or arcuate outer and inner or bottom and top edges 15, 16 converging to relatively sharp, upfacing points 17 at their extremities at the lawn-conditioning side of the rake which is shown upward in FIG. 1.

At the opposite or soil-preparing side of the rake the tines 14 are formed with straight edges 18 converging with the rounded bottom edges 15 to form relatively blunt, wedge-shaped cultivating points 19. In either operative position of the rake head the convex bottom surfaces 15 enable the tines to ride freely over the ground, in being pushed as well as pulled, and while held at different angles or attitudes.

It will be appreciated that in the lawn-conditioning position the sharp points or teeth 18 ride over the ground and pick up and collect the raked material on the upper surfaces 16 whereas with the rake turned over for soil preparing the blunter points or cultivating teeth 19 cut into and loosen or break up the soil, thereby working it for seeding and the like purposes.

Figure 4:
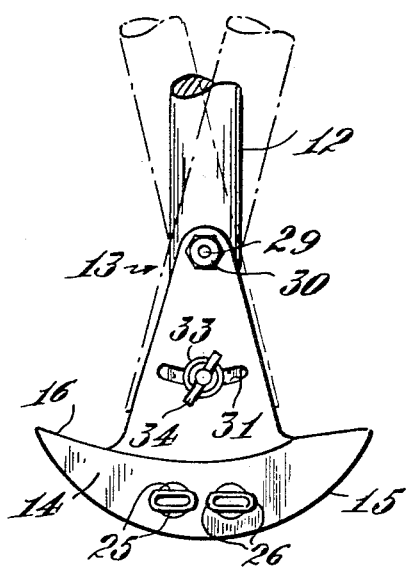
FIG. 4 is a side elevation of the rake detailing the tine-fitting and handle-mounting constructions.
Figure 3:
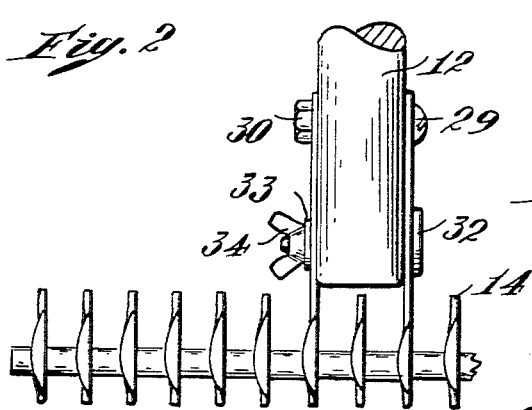
FIG. 3 is a like fragmentary elevation of the rake head, showing the turned-over portions of the tines as viewed from the under side.

The tines 14 are formed also with turned-over or laterally overset portions 20, FIGS. 1, 3 and 4, by deflecting short segments of the bottom edges 15 to the rear of the points 19. The turned-over segments or flanges 20 provide a flattened area at the base of the teeth 19, qualifying the tines 14 as flared threat, and facilitating the soil-cultivating purpose further to be described.

In accordance with the invention, the tines 14 are formed with two or more sets of openings 21 recessing or, as herein, aperturing the same, and in or through which are received and passed a like number of longitudinally extending, laterally spaced, transverse mounting or axle elements or members, herein comprising the hollow tubes 22, 23, on which the tines 14 are therefore carried or mounted in spaced, parallel upstanding position, as shown, FIG. 1.

It will be seen that when distributed along the tubes 22, 23, the tines 14 have rotational stability relative to and by the plurality of the tubes. That is, with the tubes 22, 23 in fixed relative position the tines 14 are securely held against rotation therearound, and firmly resist turning as by a root, stone, or other immovable object, such as would tend to loosen or rupture the engagement or mounting of a tine on or about only the usual single transverse axle member.

In accordance with the invention, means integral with the tubes 22, 23 are provided also for rigidly fixing the tines 14 in the desired spaced-apart relation, and also for retaining them both against rotating around the tubes and against rocking on, or swinging from their plane normal to, said tubes 22, 23. In a preferred mode of accomplishing this the tubes 22, 23 are subjected to flattening as in a jig, between the tines 14, forming the tine-intervening tube portions into segments 24 which are straight across the tops and bottoms 25 and rounded at the ends 26, FIG. 4. The flattening and closing together of the tops and bottoms 25 of the tubes 22, 23, to a spacing less than the diameter of the tine 14 openings 21, serves to bulge the tubes in the opposite direction, or expand the rounded ends 26 to a spacing greater or farther apart than the diameter of the tine openings 21, as also seen from FIG. 4.

Figure 2:
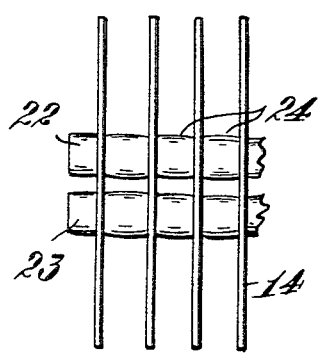
FIG. 2 is a fragmentary front elevation of the rake head, showing the deformation of the axle tubes between the spaced tines.

The desired forming of the tubes into the pillow-like segments 24, oriented in any direction and bulging or bending around or outward of and at both sides of the tine openings 21, FIG. 2, may of course be accomplished in other ways, as by expanding the tubes with pneumatic or hydraulic pressure. But we have achieved excellent results economically by the preferred method just described.

It will be appreciated that the tubes 22, 23 may initially be of any shape and size to fit within the tine openings 21, which are conveniently cut round, and to be thereafter sufficiently enlarged relative to the said tine openings, to wedge between the tines 14, and thereby rigidly lock them against lateral shifting. However, for the forming by compressing and bulging of the tine-intervening segments 24, the tubes 22, 23, conveniently are, in applicants' practice, initially of a round configuration that lends itself to the tine-locking deformation of the tubes in the preferred mode.

The adjustable handle connection 13 herein comprises the brackets 27, 28, formed as integral extensions on a central pair of the tines 14 and adapted to extend along the sides of, and to be clamped to, the end of the handle 12.

The brackets 27, 28 are clamped to the opposite sides of the handle by fastening or securing means, herein the bolt 29 passed through the handle and both brackets and hex nut 30 turned up on the threaded end of the bolt to clamp the brackets against the handle, which afford a hinging of the parts, or permit their relative adjustment or rotation, as indicated in FIG. 4, to different desired angular relations of the head and handle.

Further in accordance with the invention, means are provided for establishing a range of relative movement of the parts or head and handle, and for releasably securing the same in the desired angular relation, and herein comprising mating arcuate slots 31 in the similar, juxtaposed brackets 27, 28, together with releasable clamping means, such as the bolt 32 received through the handle and through both sets of slots 30 and the washer and wing nut 33, 34 received and turned-up on the threaded end of the bolt for releasably clamping the said brackets 27, 28 between the washer 33 and the head of bolt 32. It will be seen that merely by releasing and re-tightening the nut 34 the handle 12 may readily be adjusted from the solid-line to either of the dotted-line positions of FIG. 4.

The invention rake will be seen from the foregoing description to be of multi-purpose design and function. Held with the points 17 down for lawn cleaning, the invention device has the important advantage over conventional rakes of capability for self-cleaning. That is, in lieu of the tedious and time-consuming process with conventional rakes of clearing leaves and other tine-clogging material by hand, the operator need merely reverse the pulling stroke, or in other words simply push the invention rake, for it to be self-cleaned, or to rid itself of leaves, grass, and lawn debris. Hence the invention rake can be cleaned without ever having to lift it off the ground.

Those skilled in the art will appreciate that in its lawn-cleaning application our improved rake is particularly advantageous for dressing lawns subject to wear, for straightening up bent grass to enable its more efficient and less-destructive mowing, and for cleaning out matter, grass-smothering thatch and the like to enable sunlight, water and fertilizer to attain their maximum beneficial effect.

Turned over with the points 19 down, the invention rake is advantageously employed for pulverizing the soil around trees and bushes, cultivating, harrowing, and preparing the soil for reseeding. With the rake turned this way the flaring or flanges 20 will be seen to facilitate the working and loosening of the soil.

It should be understood that the present disclosure is for the purpose of illustration only and that this invention includes all modifications and equivalents which fall within the scope of the appended claims.

We claim:
1. In a rake of the class described, in combination, a rake head comprising
   a plurality of rigid, parallel, vertically disposed tines, said tines having rounded bottom surfaces adapting them to be pushed and pulled over the ground and at different attitudes,
   ground-engaging points formed on said tines at one side of said head and adapted to cultivate the surface when the rake head is operated in the soil-preparing position,
   material-engaging points formed on said tines at the other side of said head and adapted to rake the surface when the head is operated in the lawn-conditioning position,
   longitudinally extending axle means having laterally spaced portions engaging with portions of said tines, said axle means by their laterally spaced portions rigidly retaining said tines against rotation therearound,
   means associated with said axle portions for rigidly fixing said tines against shifting longitudinally of and rocking from their planes normal to said axle members,
   said tine fixing means comprising tubes having tine intervening portions formed to a dimension larger than the dimension of said tine formations,
   said tubes further having other portions flattened to a dimension less than that of said tine formations,
   a rigid elongated handle member,
   bracket means connecting said head to said handle member, and
   means adapting said bracket means for connecting said head to said handle in different angular relations.

References Cited

UNITED STATES PATENTS

| | | | |
|---|---|---|---|
| 2,527,227 | 10/1950 | Namet | 29—522 |
| 3,193,999 | 7/1965 | Hester | 56—400.16 |
| 3,299,545 | 1/1967 | Husted | 56—400.16 |

ABRAHAM G. STONE, *Primary Examiner.*

J. W. PETERSON, *Assistant Examiner.*